(12) United States Patent
Jiang

(10) Patent No.: US 8,230,046 B2
(45) Date of Patent: Jul. 24, 2012

(54) SETTING COOKIES IN CONJUNCTION WITH PHASED DELIVERY OF STRUCTURED DOCUMENTS

(75) Inventor: Changhao Jiang, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 293 days.

(21) Appl. No.: 12/638,926

(22) Filed: Dec. 15, 2009

(65) Prior Publication Data

US 2011/0145321 A1   Jun. 16, 2011

(51) Int. Cl.
    *G06F 13/00* (2006.01)
(52) U.S. Cl. .................. 709/219; 709/223; 709/227
(58) Field of Classification Search .............. 709/217, 709/219, 223, 225, 227, 228
    See application file for complete search history.

(56) References Cited

U.S. PATENT DOCUMENTS

| 6,070,185 A * | 5/2000 | Anupam et al. ............. 709/204 |
| 7,523,158 B1 * | 4/2009 | Nickerson et al. ........... 709/203 |
| 2010/0023475 A1 * | 1/2010 | Lahav ............................ 706/59 |

* cited by examiner

*Primary Examiner* — Viet Vu
(74) *Attorney, Agent, or Firm* — Baker Botts L.L.P.

(57) ABSTRACT

In one embodiment, a method includes receiving a first request from a client for a target structured document and generating the target structured document and one or more parameters for one or more state objects associated with the client. In a particular embodiment, the method includes, in a first response phase, transmitting a first portion of the target structured document to the client. In a particular embodiment, the method further includes, in a second response phase, transmitting a second portion of the target structured document that includes a code segment. The method may additionally include receiving a second request from the client sent from the client as a result of the client executing the code segment, and transmitting a response to the second request that comprises the one or more parameters for the one or more state objects.

3 Claims, 8 Drawing Sheets

SETTING COOKIES IN CONJUNCTION WITH PHASED DELIVERY OF STRUCTURED DOCUMENTS

TECHNICAL FIELD

The present disclosure relates generally to serving structured documents (such as web pages) to remote clients and, more particularly, to setting cookies after an initial response header that typically includes cookie parameters has already been sent. In a particular implementation, the present invention can be used in conjunction with using phased, partial delivery of structured documents for use in rendering such structured documents.

BACKGROUND

Conventionally, when a request for a web page or other structured document transmitted by a client device is received by a server or computing system hosting the web page, the hosting system typically generates a base web page in the form of a Hyper Text Markup Language (HTML), Extensible Markup Language (XML), or other web browser-supported structured document. The generated structured document is then transmitted as a whole in a response to the requesting client via a Hypertext Transfer Protocol (HTTP) or other suitable connection for rendering at the client device. The structured document may include one or more resources (e.g. a JavaScript script or resource, a Cascading Style Sheet (CSS) resource, an image, a video, etc.), or references to such resources, embedded within the transmitted document. By way of example, a resource embedded in an HTML document may generally be included or specified within a script element, image element, or object element, among others, depending on the type of resource. The element referencing or specifying the resource may include a source attribute (e.g., src) identifying a location of the resource to the client requesting the web page. Typically, upon receipt of the response, the web browser or other client application running at the client device then constructs a document object model (DOM) representation of the received structured document and requests the resource(s) (which may be at one or more other external locations) embedded in the document.

DESCRIPTION OF EXAMPLE EMBODIMENTS

Particular embodiments relate to efficiently generating and rendering web pages and other structured documents. Particular embodiments further relate to setting one or more cookies in conjunction with using phased, partial delivery of structured documents for use in rendering such structured documents.

In various example embodiments, one or more described web pages may be associated with a social networking system or social networking service. However, alternate embodiments may have application to the retrieval and rendering of structured documents hosted by any type of network addressable resource or web site. Additionally, as used herein, a "user" may be an individual, a group, or an entity (such as a business or third party application).

Figure 1:
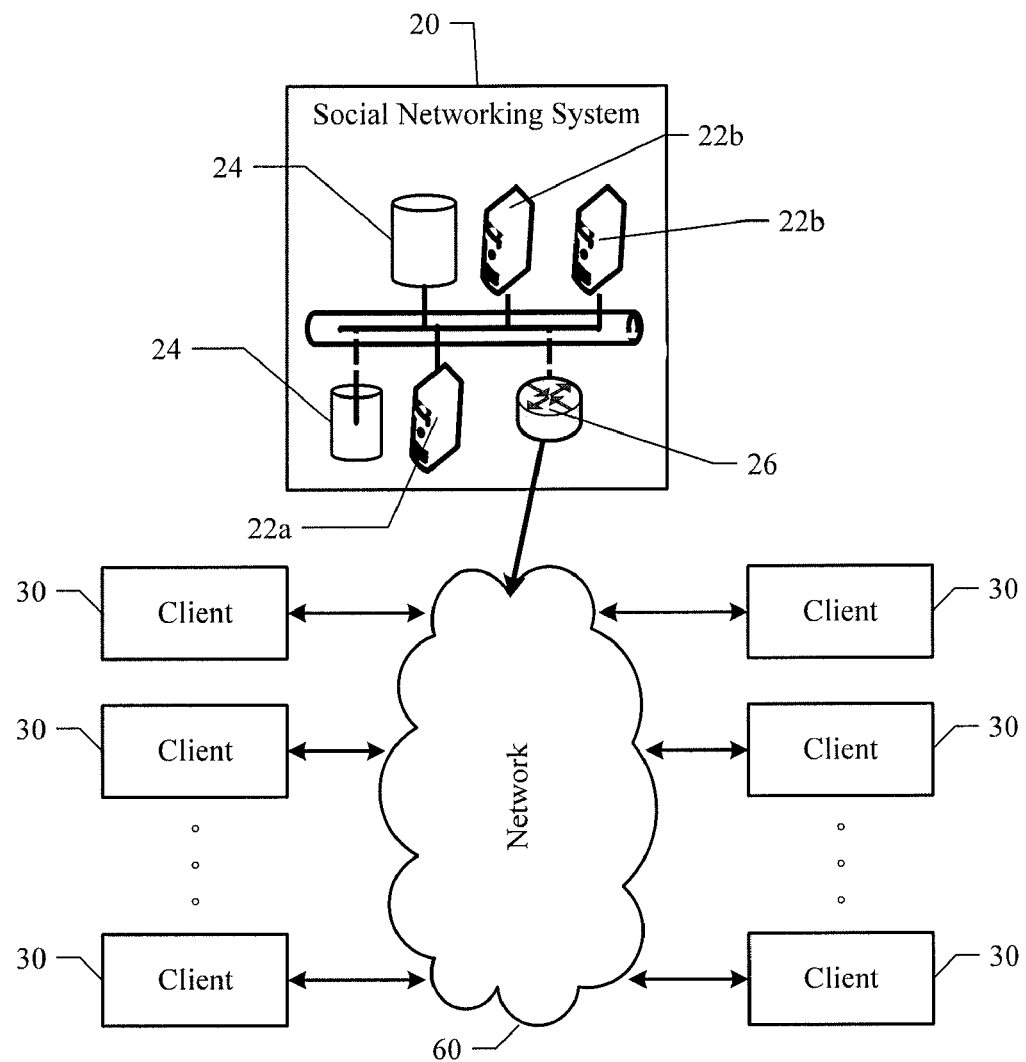
FIG. 1 illustrates an example network environment.

Particular embodiments may operate in a wide area network environment, such as the Internet, including multiple network addressable systems. FIG. 1 illustrates an example network environment, in which various example embodiments may operate. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. As FIG. 1 illustrates, particular embodiments may operate in a network environment comprising social networking system 20 and one or more client devices 30. Client devices 30 are operably connected to the network environment via a network service provider, a wireless carrier, or any other suitable means.

In one example embodiment, social networking system 20 comprises computing systems that allow users to communicate or otherwise interact with each other and access content, such as user profiles, as described herein. Social networking system 20 is a network addressable system that, in various example embodiments, comprises one or more physical servers 22 and data store 24. The one or more physical servers 22 are operably connected to computer network 60 via, by way of example, a set of routers and/or networking switches 26. In an example embodiment, the functionality hosted by the one or more physical servers 22 may include web or HTTP servers, FTP servers, as well as, without limitation, web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), and the like.

Physical servers 22 may host functionality directed to the operations of social networking system 20. By way of example, social networking system 20 may host a website that allows one or more users, at one or more client devices 30, to view and post information, as well as communicate with one another via the website. Hereinafter servers 22 may be referred to as server 22, although server 22 may include numerous servers hosting, for example, social networking system 20, as well as other content distribution servers, data stores, and databases. Data store 24 may store content and data relating to, and enabling, operation of the social networking system as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 24 corresponds to one or more of a variety of separate and integrated databases, such as relational databases and object-oriented databases, that maintain information as an integrated collection of logically related records or files stored on one or more physical systems. Structurally, data store 24 may generally include one or more of a large class of data storage and management systems. In particular embodiments, data store 24 may be implemented by any suitable physical system(s) including components, such as one or more database servers, mass storage media, media library systems, storage area networks, data storage clouds, and the like. In one example embodiment, data store 24 includes one or more servers, databases (e.g., MySQL), and/or data warehouses.

Data store 24 may include data associated with different social networking system 20 users and/or client devices 30. In particular embodiments, the social networking system 20 maintains a user profile for each user of the system 20. User profiles include data that describe the users of a social network, which may include, for example, proper names (first, middle and last of a person, a trade name and/or company name of a business entity, etc.) biographic, demographic, and other types of descriptive information, such as work experience, educational history, hobbies or preferences, geographic location, and additional descriptive data. By way of example, user profiles may include a user's birthday, relationship status, city of residence, and the like. The system 20 may further store data describing one or more relationships between different users. The relationship information may indicate users who have similar or common work experience, group memberships, hobbies, or educational history. A user profile may also include privacy settings governing access to the user's information is to other users.

Client device 30 is generally a computer or computing device including functionality for communicating (e.g., remotely) over a computer network. Client device 30 may be a desktop computer, laptop computer, personal digital assistant (PDA), in- or out-of-car navigation system, smart phone or other cellular or mobile phone, or mobile gaming device, among other suitable computing devices. Client device 30 may execute one or more client applications, such as a web browser (e.g., Microsoft Windows Internet Explorer, Mozilla Firefox, Apple Safari, Google Chrome, and Opera, etc.), to access and view content over a computer network. In particular implementations, the client applications allow a user of client device 30 to enter addresses of specific network resources to be retrieved, such as resources hosted by social networking system 20. These addresses can be Uniform Resource Locators, or URLs. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

A web page or resource embedded within a web page, which may itself include multiple embedded resources, may include data records, such as plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Cascading Style Sheet (CSS), and, frequently, Java. By way of example, HTML enables a page developer to create a structured document by denoting structural semantics for text and links, as well as images, web applications and other objects that can be embedded within the page. Generally, a web page may be delivered to a client as a static document, however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

More particularly, HTML enables developers to embed objects or resources, including web applications, widgets, images, or videos, within a structured document such as a web page. Generally, an HTML structured document is written in the form of HTML elements that consist of tags (surrounded by angle brackets) within the structured document content, which act as indicators to a web browser rendering the structured document as to how the document is to be interpreted by the web browser and ultimately presented on a user's display. By way of example, HTML elements may represent headings, paragraphs, hypertext links, embedded media, and a variety of other structures. HTML can include or can load scripts in languages such as JavaScript, which affect the behavior of HTML processors such as conventional web browsers, and Cascading Style Sheets (CSS), which define the appearance and layout of text and other content. HTML elements are the basic components for HTML and have two basis properties: attributes and content. Each element's attributes and content have certain restrictions that must be followed for an HTML element to be considered valid. An HTML element usually has a start tag (e.g., <element-name>) and an end tag (e.g., </element-name>). The element's attributes are contained in the start tag and content is located between the tags (e.g., <element-name attribute="value">Content</element-name>).

By way of example, HTML elements can include structural elements (e.g., describing the purpose of text or other content), presentational elements (e.g., describing the appearance of text or other content regardless of its function), and Hypertext elements (e.g., making part of a document into a link to another document). Most elements can take any of several common attributes. By way of example, the id attribute provides a document-wide unique identifier for an element, the class attribute provides a way of classifying similar elements, and the title attribute is used to attach subtextual explanation to an element. HTML also defines several data types for element content, such as script data and stylesheet data, and numerous types for attribute values, including, by way of example, IDs, names, URIs or URLs, numbers, units of length, languages, media descriptors, colors, character encodings, dates and times, etc.

Document structure elements include the root element (defined by the starting and ending tags <html> and </html>, respectively), head elements (defined by the starting and ending tags <head> and </head>, respectively), and body elements (defined by the starting and ending tags <body> and </body>, respectively). The root element tags <html> and </html> delimit the beginning and end of an HTML document, respectively. All other HTML elements of a given HTML document are included within the root element. The head element tags <head> and </head> define a container for processing information and metadata for an HTML document. Example document head elements found within the head element container include the base element (defined by starting and ending tags <base> and </base>, respectively), which specifies a base uniform resource locator (URL) for all relative href and other links in the HTML document, the link element (defined by starting and ending tags <link> and </link>, respectively), which specifies links to other documents (e.g., for external CSS resources), the meta element (defined by starting and ending tags <meta> and </meta>, respectively), which can be used to specify additional metadata about an HTML document, the object element (defined by starting and ending tags <object> and </object>, respectively), used for including generic objects within the document header, the script element (defined by starting and ending tags <script> and </script>, respectively), which can act as a container for script instructions (e.g., JavaScript) or a link to an external script with the src (source) attribute, the style element (defined by starting and ending tags <style> and </style>, respectively), which specifies a style for the document and which can act as a container for style instructions (e.g., inlined CSS rules), and the title element (defined by starting and ending tags <title> and </title>, respectively), which defines a document title.

The body element <body> serves as a container for the displayable content of an HTML document. Example body elements include block elements (e.g., basic text and list elements, among others), inline elements (e.g., anchor and phrase elements), and image and object elements. A script element positioned within the body element may be used to place a script in the document (e.g., the script element may contain instructions to dynamically generate block or inline content). The image element (defined by starting and ending tags <img> and </img>, respectively) may be used to insert an image into the document. By way of example, the image element may include an src attribute that specifies a URL where the image is located. The object element (defined by starting and ending tags <object> and </object>, respectively) may be used to insert an object into the document of the type specified in an included type attribute. Another frequently used HTML element is the frameset element, which may be used as an alternative to the body element.

Generally, a web application is an application that may be accessed via a web browser or other client application over a network, or a computer software application that is coded in a web browser-supported language and reliant on a web browser to render the application executable. Web applications have gained popularity largely as a result of the ubiquity of web browsers, the convenience of using a web browser launched at a remote computing device as a client (sometimes referred to as a thin client), and the corresponding ability to update and maintain web applications without distributing and installing software on remote clients. Often, to implement a web application, the web application requires access to one or more resources provided at a backend server of an associated website. Additionally, web applications often require access to additional resources associated with other applications.

Social networking system 20 may include a multitude of features with which users at remote clients 30 may interact during user sessions. In particular embodiments, these features may be implemented as web applications and may utilize JavaScript and CSS resources requested from servers 22 as well as other external servers or data stores. The web applications or resources may be embedded in various underlying or base web pages served to remote clients, such as in frames or iFrames, sections or "divs" and the like. By way of example, the social networking system hosted by Facebook®, Inc. of Palo Alto, Calif., includes or supports such features as the "wall," a space on every user's profile page that allows friends to post messages for the user to see; "pokes," which allows users to send a virtual "poke" to each other (a notification that tells a user that they have been poked); "photos," where users can upload albums and photos; "status,"
which allows users to inform their friends of their whereabouts and actions; "streams," which may appear in multiple locations on the site, including on every user's homepage, which include information about the activities of the user's connections; "notes," a blogging feature that allows tags and embeddable images as well as blogs imported from other blogging websites and services; as well as a large number of third party applications for which the website serves as a platform. In particular, a user's wall is visible to anyone who is able to see that user's profile, depending on privacy settings, and supports the posting of attachments as well as textual content.

In particular embodiments, the social networking system 20 maintains in data store 24 a number of objects for the different kinds of items with which a user may interact while accessing social networking system 20. In one example embodiment, these objects include user profiles, application objects, and message objects (such as for wall posts, emails and other messages). In one embodiment, an object is stored by the system 20 for each instance of its associated item. These objects and the actions discussed herein are provided for illustration purposes only, and it can be appreciated that an unlimited number of variations and features can be provided on a social networking system 20.

When a user at a client device (e.g., client device 30) desires to view a particular web page (hereinafter also referred to as target structured document) hosted by social networking system 20, the user's web browser, or other document rendering engine or suitable client application, formulates and transmits a request to social networking system 20. The request generally includes a URL or other document identifier as well as metadata or other information. By way of example, the request may include information identifying the user, such as a user ID, as well as information identifying or characterizing the web browser or operating system running on the user's client computing device 30. The request may also include location information identifying a geographic location of the user's client device or a logical network location of the user's client device. The request may also include a timestamp identifying when the request was transmitted.

Often, it is desirable, advantageous, or even required to set one or more cookies for use during a client or user session between a client device and a server hosting a web page. A cookie (also known as a tracking cookie, browser cookie, or HTTP cookie) is generally a small string or segment of text that may be transmitted to a client device and stored at the client device by a web browser. More specifically, a cookie may consist of one or more name-value pairs containing bits of information such as, by way of example and not by way of limitation, user preferences, an identifier for a server-based user session, or other data used by a server or web site. A cookie may be used for authenticating, session tracking (state maintenance), and for tracking specific information about a user, such as site preferences, or to maintain data related to the user during navigation. Typically, a cookie is sent in an HTTP header by the server to the web browser at the client device. The cookie is then sent back to the server unchanged by the web browser each time the web browser accesses the server, introducing state into what may be otherwise stateless HTTP transactions. In a conventional implementation, to set a cookie at a client device in response to a request for a target web page, the server formulates and transmits an HTTP response that includes an HTTP header that includes the parameters for the cookie (e.g., in the form of text) and often code (e.g., Set-Cookie) requesting the client's web browser to set the cookie based on the parameters in the HTTP header. There are generally two classes of cookies: HTTPOnly cookies and non-HTTPOnly cookies. The former variety must be set by the server and sent in the HTTP header to the client for setting at the client while the latter variety may be set by the client device or transmitted in another portion of an HTTP response other than the HTTP header.

Typically, it may be desirable or advantageous to serve a given web page request in two or more response phases, such that each response phase includes only a portion of the structured document or resources required to render the web page. In particular embodiments, such a phased, partial delivery approach to serving a web page may be used to simulate progressive downloading of the web page to the requesting client. Additionally, in some embodiments, a phased, partial delivery approach to serving a web page may be used in conjunction with predictive resource identification and resource pre-fetching when serving the web page.

Figure 2:
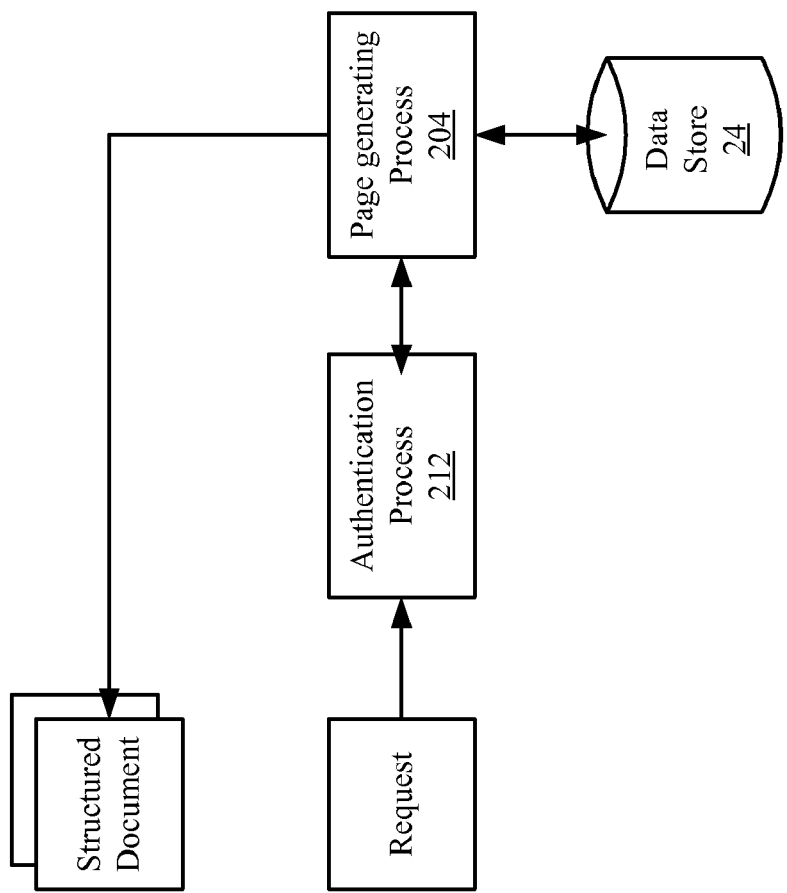
FIG. 2 illustrates a block diagram of example components of an example networking system.
Figure 3:
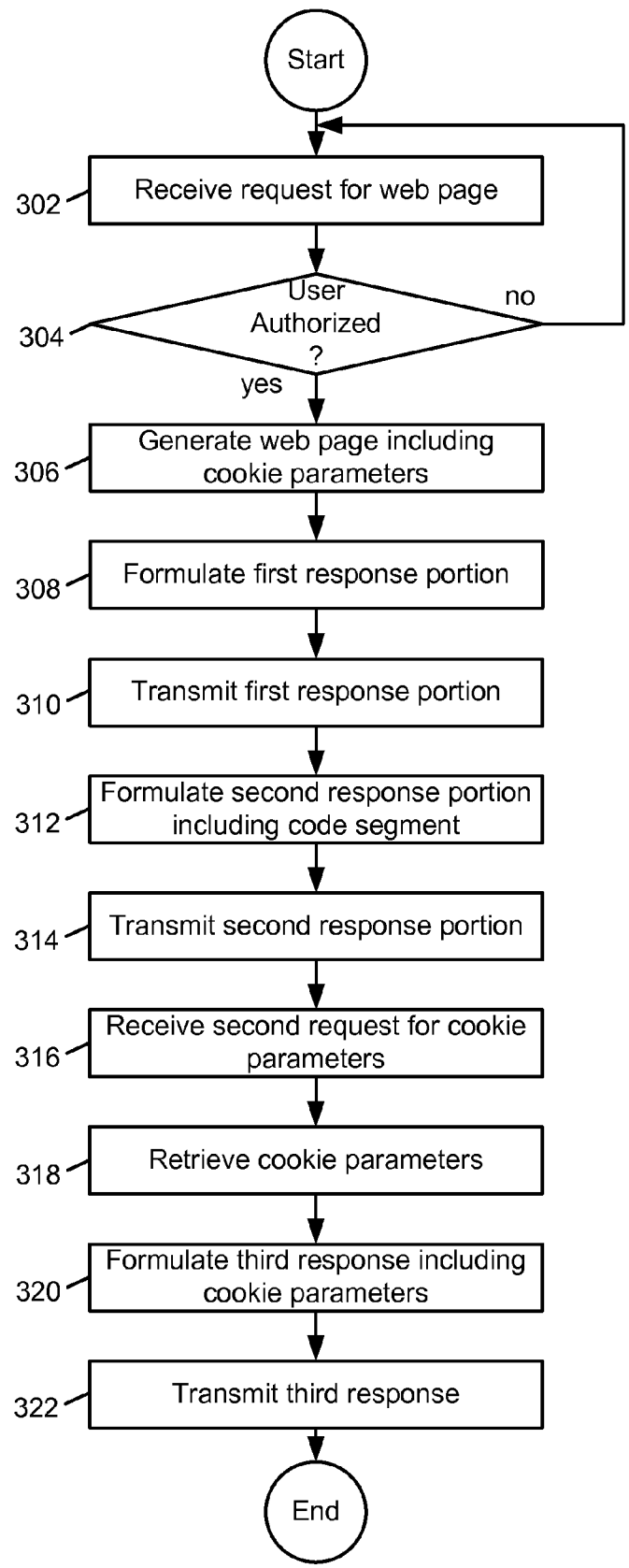
FIG. 3 shows a flowchart illustrating an example method for setting one or more cookies in conjunction with serving a request for a web page.

A method for serving a request for a web page will now be described with reference to the block diagram of FIG. 2 and the flowchart of FIG. 3. In an example embodiment, the method begins at 302 with receiving a request for a web page by social networking system 20. As described above, the request may be in the form of an HTTP request and generally includes a URL or other document identifier as well as metadata or other information. By way of example, the request may include information identifying the user, such as a user ID, as well as information identifying or characterizing the web browser or operating system running on the user's client computing device 30. The request may also include location information identifying a geographic location of the user's client device or a logical network location of the user's client device. The request may also include a timestamp identifying when the request was transmitted. In one example embodiment, an authentication process 212 (e.g., executing within server 22) may first determine, at 304, whether the user making the request is authorized to receive the web page.

In particular embodiments, assuming that the user is authorized to receive the web page, page generating process 204 (e.g., executing within server 22) then proceeds to generate the web page (e.g., in the form of an HTML or other structured document) at 306 including structured document code and the content to be displayed as well as the embedded resources, or embedded identifiers for the resources, for rendering the web page at the client device. In particular embodiments, as page generating process 204 is generating the web page at 306, page generating process 204 also generates parameters for one or more cookies (also referred to herein as "state objects") to be set at the client device. In particular embodiments, as the parameters for the cookie(s) are generated with the construction of the web page, page generating process 204 buffers, or causes to be buffered, the parameters for the cookie(s). In particular embodiments, the buffered parameters are stored in a cache, using a facility such as memcached. In particular embodiments, a key for retrieving the stored parameters from memcached (or other suitable storage facility) is also generated.

In particular embodiments, page rendering process 204 formulates a first response portion at 308 that includes at least a portion of the structured document including one or more of structured document code, content to be displayed, and/or the corresponding resources, or identifiers to these resources (e.g., in the form of script, image, or object elements having corresponding source (src) identifiers for locating the selected resources). In particular embodiments, the first response portion is then transmitted to the client at 310 in the form of an HTTP response. In particular embodiments, the first response portion may be transmitted before the entire structured document is generated. In particular embodiments, the connection over which the first response portion is transmitted to the client device is a persistent HTTP connection and/or persistent Transmission Control Protocol (TCP) connection. This allows the client to receive, and to begin processing of, resources required for rendering the structured document while the remainder of the page is generated.

In particular embodiments, page generating process 204 then formulates a second response portion at 312 that may include a second portion of the structured document, which may include the remainder (or a portion thereof) of the structured document for rendering the web page. That is, in particular embodiments, page generating process 204 first checks which portions of the structured document or resources have already been transmitted or identified in the first response portion transmitted to the client device such that the second response portion includes all the code, content, and resources (or identifiers thereof) required to render the requested web page other than the resources transmitted in, or identified in, the first response portion. In particular embodiments, the second response portion further includes the key for retrieving the parameters for the cookie(s) stored in memcached as well as an executable code segment. The second response portion is then transmitted to the client at 314. As described above, as the first response portion may be sent over a persistent connection (e.g., a persistent HTTP or TCP connection), the second response portion may be sent over the same connection and may be considered as a subsequently transmitted part of the HTTP response in which the first response portion was transmitted. Alternately, the second response portion may be transmitted as a new HTTP response.

In particular embodiments, when the second response portion is received at the client, the executable code segment is configured to cause the client's web browser or other client application to generate and transmit a second request to social networking system 20. By way of example, the executable code segment transmitted in the second response portion may be, or include, a JavaScript code segment that causes the client's web browser to formulate and transmit an AJAX call to server 22 that also includes the key for retrieving the cookie parameters. Upon receipt of the AJAX call (or other second suitable request) at 316, the server uses the key to retrieve the cookie parameters at 318. In particular embodiments, page generating process 204 then formulates a third response (which may be transmitted in a second HTTP response) that includes the parameters for the cookie(s) in the HTTP header at 320. The third response may also include any remaining portion of the structured document. The third response is then transmitted to the client at 322. Upon receipt by the client, the client's web browser or other client application rendering the web page, sets the cookie(s) based on the parameters transmitted in the third response.

In such a manner, the client device, and particularly a web browser at the client device, may begin downloading, parsing, and executing the resources transmitted in or identified in the first response portion while (or before) page generating process 204 is generating the structured document for the web page. In this way, the web browser may begin processes associated with rendering the web page (such as accessing and initializing scripts, etc.), before the second response is even received and perhaps before the completed remaining portions of the web page are even generated by page generating process 204 (i.e., the rendering of the web page may overlap the generating and/or transmitting of the web page), thereby significantly reducing the latency in rendering the page and, potentially significantly increasing the network performance of the social networking system 20 as a whole.

The method described above with reference to FIG. 3 is particularly suited for setting HTTPOnly cookies as such cookies must be set by the server and transmitted in the HTTP header. Below, a second method for serving a request for a web page and setting one or more non-HTTPOnly cookies at a client will now be described with reference to the flowchart of FIG. 4. In an example embodiment, the method begins at 402 with receiving a request for a web page by social networking system 20. As described above, the request is generally an HTTP request and generally includes a URL or other document identifier as well as metadata or other information. By way of example, the request may include information identifying the user, such as a user ID, as well as information identifying or characterizing the web browser or operating system running on the user's client computing device 30. The request may also include location information identifying a geographic location of the user's client device or a logical network location of the user's client device. The request may also include a timestamp identifying when the request was transmitted. At 404, an authentication process 212 may first determine whether the user making the request is authorized to receive the web page.

In particular embodiments, assuming that the user is authorized to received the web page, page generating process 204 then proceeds to generate the web page (e.g., in the form of an HTML or other structured document) at 406 including structured document code and the content to be displayed as well as the embedded resources, or embedded identifiers for the resources, for rendering the web page. In particular embodiments, as page generating process 204 is generating the web page at 406, page generating process 204 also generates parameters for one or more cookies to be set at the client device.

In particular embodiments, page rendering process 204 formulates a first response portion at 408 that includes at least a portion of the structured document including one or more of structured document code, content to be displayed, and/or the corresponding resources, or identifiers to these resources (e.g., in the form of script, image, or object elements having corresponding source (src) identifiers for locating the selected resources). In particular embodiments, the first response portion is then transmitted to the client at 410 in the form of an HTTP response. In particular embodiments, the connection over which the first response portion is transmitted to the client device is a persistent HTTP or TCP connection.

In particular embodiments, the first response portion may be transmitted before the entire structured document is generated. In such embodiments, page generating process 204 then formulates a second response portion at 412 that may include a second portion of the structured document, which may include the remainder (or a portion thereof) of the structured document for rendering the web page. That is, in particular embodiments, page generating process 204 first checks which portions of the structured document or resources have already been transmitted or identified in the first response portion transmitted to the client device such that the second response portion includes all the code, content, and resources (or identifiers thereof) required to render the requested web page other than the resources transmitted in, or identified in, the first response portion. In particular embodiments, the second response portion further includes the parameters for the cookie(s) as well as an executable code segment (e.g., a JavaScript code segment). The second response portion is then transmitted to the client at 414. As described above, as the first response portion may be sent over a persistent connection (e.g., a persistent HTTP or TCP connection), the second response portion may be sent over the same connection and may be considered as a subsequently transmitted part of the HTTP response in which the first response portion was transmitted. Alternately, the second response portion may be transmitted as a new HTTP response.

Again, in such a manner, the client device, and particularly a web browser at the client device, may begin downloading, parsing, and executing the resources transmitted in or identified in the first response portion while (or before) page generating process 204 is generating the structured document for the web page. In this way, the web browser may begin processes associated with rendering the web page (such as accessing and initializing scripts, etc.), before the second response portion is even received and perhaps before the completed remaining portions of the web page are even generated by page generating process 204 (i.e., the rendering of the web page may overlap the generating and/or transmitting of the web page), thereby significantly reducing the latency in rendering the page and, potentially significantly increasing the network performance of the social networking system 20 as a whole.

In particular embodiments, when the second response portion is received at the client, the executable code segment is configured to cause the client's web browser or other client application to set one or more cookies at the client device based on the parameters in the second response portion. It should be appreciated that some of the non-HTTPOnly cookie parameters may also be transmitted in the first response portion.

Figure 4:
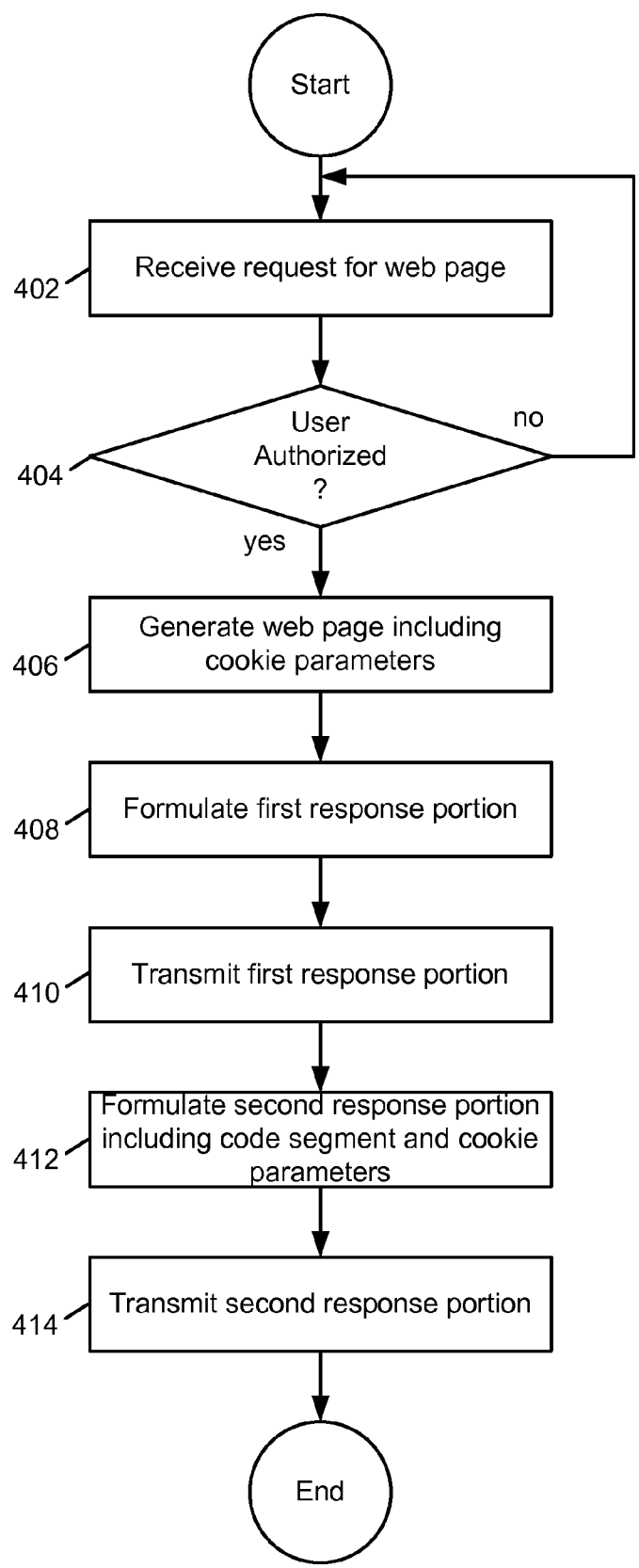
FIG. 4 shows a flowchart illustrating an example method for setting one or more cookies in conjunction with serving a request for a web page.

It should also be appreciated that, in some embodiments, the methods described with reference to FIGS. 3 and 4 may both be used to serve a requested web page and to set both HTTPOnly and non-HTTPOnly cookies at the requesting client. By way of example, in particular embodiments, as page generating process 204 is generating the web page and parameters for cookies to be transmitted and set at the client, HTTPOnly cookie parameters may be buffered and stored as described with reference to the flow chart of FIG. 3 while non-HTTPOnly cookie parameters are transmitted in the second response with a JavaScript code segment that is configured to cause the non-HTTPOnly cookies to be set at the client as described with reference to the flow chart of FIG. 4.

Particular embodiments may also include accessing a resource utilization log to predict what resources may be required for a particular web page before the web page is actually generated and transmitted to a client computing device, or even requested by a client computing device. More specifically, in particular embodiments, when a web page (such as a profile page, home page, or canvas page) requested by a client computing device is generated by a server or system hosting the web page, one or more servers, databases (e.g., MySQL), and/or data warehouses log the underlying resources included in or specified in the response to the request that are required for rendering that particular web page at the client device. In particular embodiments, the one or more servers, databases, and/or data warehouses log some or all of the requests transmitted from some or all of the users and corresponding client computing devices associated with the web site or system hosting the web page. In particular embodiments, an offline process scans and filters the resource utilization log to generate a data array that associates selected web pages with one or more corresponding resources that, based on the analysis of the resource utilization log, are statistically determined to be likely required for rendering the corresponding web page at a client device in response to a subsequent request for the web page at a later time point. That is, in particular embodiments, only those resources that are determined to be statistically likely to be required are included in the data array.

In such embodiments, when a request for a particular web page is received by social networking system 20, the host server checks a data array to identify the resources that are likely to be required in rendering the web page. In particular embodiments, the host transmits these resources, or references to these resources, in a first response that corresponds to a first portion of the requested web page. Subsequently, the host proceeds to generate the remainder of the requested web page and formulates a second response that includes the rest of the web page and resources, or references to such resources, not transmitted in the first response. In particular embodiments, all resources actually required for rendering the web page (as determined when the web page is generated by the host) are logged in the resource utilization log, while resources not used to render the web page, including unused or unnecessary resources sent in the first response, are not logged in the resource utilization log.

Figure 5:
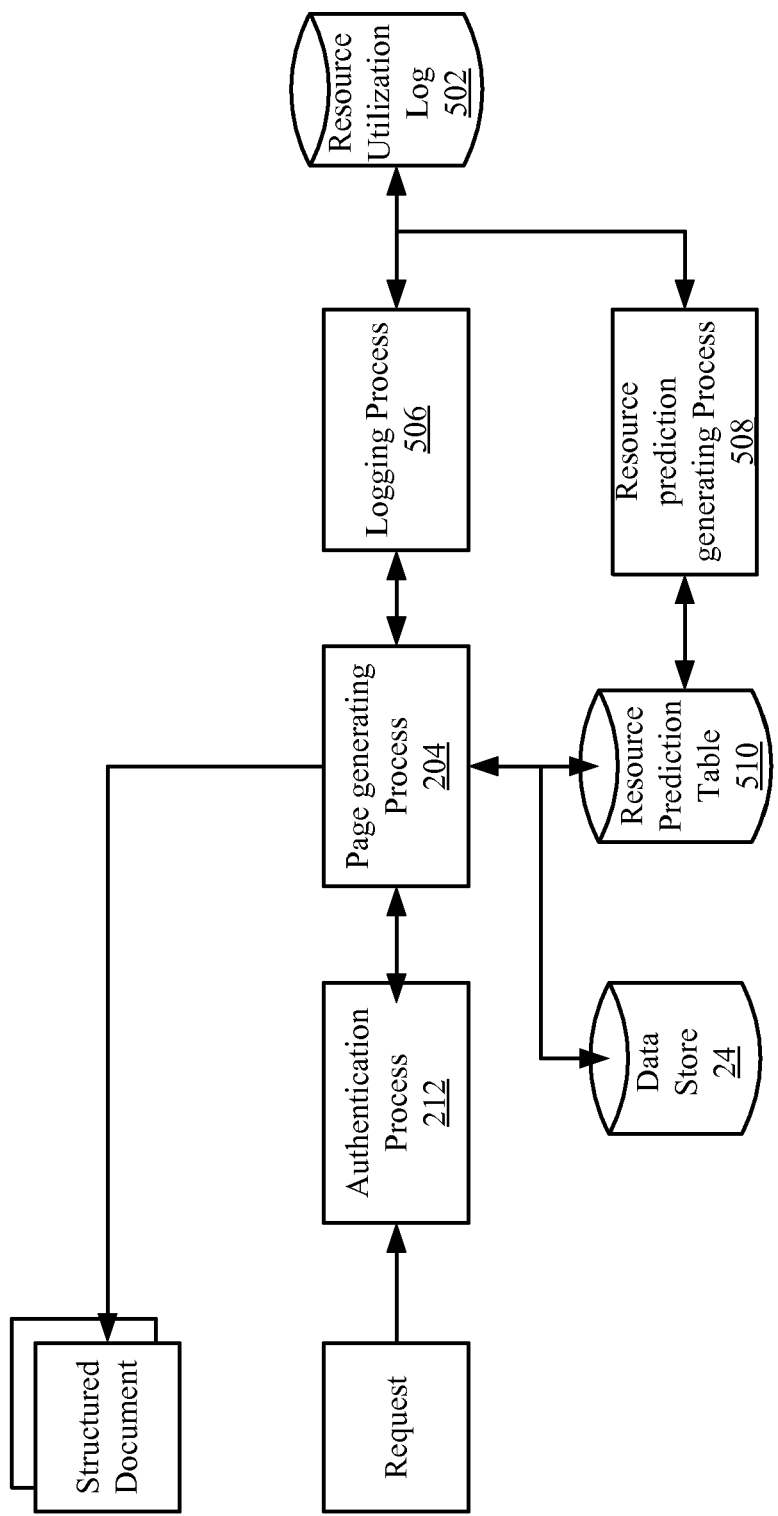
FIG. 5 illustrates a block diagram of example components of an example networking system.

By way of example, with reference to FIG. 5, in particular embodiments, social networking system 20 maintains a resource utilization log 502 in data store 24, or other suitable data store, that logs information pertaining to requested web pages and resources required or transmitted to client devices for rendering the requested web pages. In particular embodiments, when page generating process 204 generates a structured document in response to a request for a web page transmitted by a client device, a separate logging process 506 executing within social networking system 20, or alternately, page generating process 204 itself, stores or causes to be stored, a record for the web page in resource utilization log 502 that includes information associated with the response. By way of example, the information stored in the record may include a web page identifier (e.g., the URL of the web page) and the resources, or identifiers of the resources (such as embedded scripts, style sheets, and the like), included or embedded in the web page. The record may also include information identifying the user, such as a user ID, as well as information identifying or characterizing the web browser or operating system running on the user's client computing device 30. The record may also include location information identifying a geographic location of the user's client device or a logical network location of the user's client device. The record may also include a timestamp identifying when the request was transmitted by the requesting client device, when the request was received by social networking system 20, or when the response was transmitted to the client device by social networking system 20.

Figure 6:
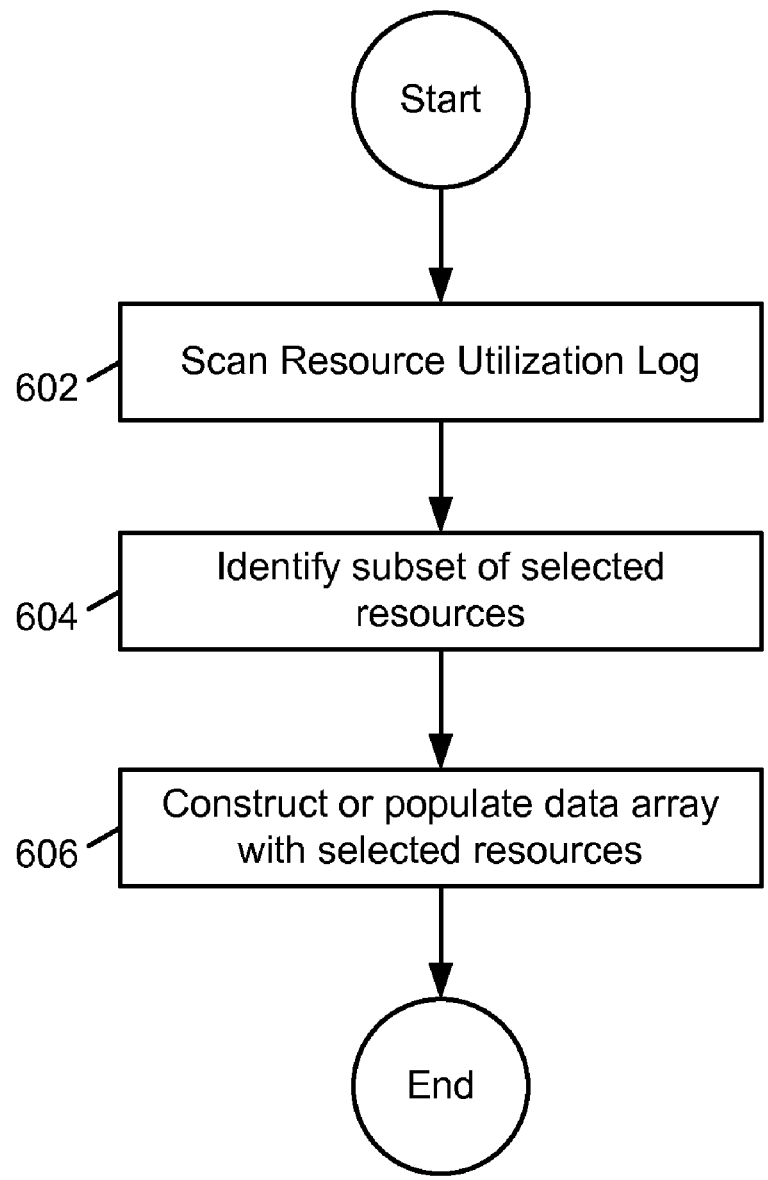
FIG. 6 shows a flowchart illustrating an example method for constructing or populating a resource prediction table.

A method for generating a resource prediction table will now be described with reference to the block diagram of FIG. 5 and the flowchart of FIG. 6. In particular embodiments, social networking system 20 further includes a resource prediction generating process 508 that periodically accesses (and scans), at 602, resource utilization log 502. By way of example, resource prediction generating process 508 may periodically access resource utilization log 502 on an hourly basis, daily basis, weekly basis, or on any other suitable time basis, as well as at predetermined times or in response to certain events or conditions, including in response to receiving a request for a web page hosted by social networking system 20. In particular embodiments, resource prediction generating process 508 scans, offline, resource utilization log 502 for records associated with selected web pages or other structured documents. That is, in particular embodiments, resource prediction generating process 508 only scans resource utilization log 502 for records associated with the selected web pages. By way of example, the selected web pages may include, by way of example and not by way of limitation, home pages, user profile pages, and "canvas" pages (canvas pages may be utilized to render web applications supported by social networking system 20) hosted by social network system 20. These web pages are generally the most "expensive" to generate and transmit, particularly in terms of network resource consumption, as they may be statistically the most requested web pages (each registered user of social networking system 20 is provided with a unique home page and profile page) and/or may generally be characterized as rich in that they may, by way of example, include numerous features and a variety of multimedia content, and as such, generally include a large number of embedded resources to enable such richness. However, although each home, profile, or canvas page may be unique to a particular user, each of these web pages generally includes one or more of the same embedded resources, particularly static resources, also embedded in other pages of the same type associated with or requested by other users (e.g., user A's home page may often include one or more resources that are also included in user B's home page), especially when statistically compared over the same time window of analysis.

In particular embodiments, for each of the selected web pages, resource prediction generating process 508 analyzes the records corresponding to that selected web page, as for example identified by a common URL or other page identifier stored in the records, across all users (e.g., all records for home pages regardless of user). In particular embodiments, for each selected web page, resource prediction generating process 508 identifies, at 604, a subset of one or more selected resources, or identifiers for the selected resources, from all the resources identified in resource utilization log 502 corresponding to the web page. By way of example, in particular embodiments, resource prediction generating process 508 computes a frequency of each resource identified in resource utilization log 502 as being used to render the web page. Resource prediction generating process 508 may then compute a probability that each of the resources is likely to be embedded in the web page in a subsequent response to a subsequent request for the web page. By way of example, assume JavaScript resource A.js was identified in 84 out of 100 records corresponding to a particular web page requested (or for which a response was generated) over a predetermined time window (e.g. the last 7 days, the last month, the last year, or a selected day, week, or month of last year) as determined by a timestamp included in each of the records. In one example embodiment, the probability that A.js will be included or embedded within the structured document of the web page in response to a subsequent request for the web page may be calculated as the number of records in which A.js is identified divided by the total number of records corresponding to the same web page identifier, thus yielding 84/100=0.84 or 84%. Also assume the CSS resource B.css was identified in 47 out of the 100 records corresponding to the particular web page. The probability that B.css will be included or embedded within the structured document of the web page in response to a subsequent request for the web page may be calculated as 47/100=0.47 or 47%.

Resource prediction generating process 508 may then compare the probability for each resource corresponding to the web page to a predetermined threshold value (which may be uniform across all selected web pages or be specifically predetermined for the selected web page). By way of example, a suitable threshold value may be approximately 0.80 or 80% (although the threshold value may vary widely in other embodiments or across different web pages). In particular embodiments, resource prediction generating process 508 identifies, at 304, those resources having a probability greater then the threshold as the selected resources corresponding to the web page. In the above example, A.js would be identified as a selected resource as 84% is greater than the threshold of 80%, while B.css would not be identified as a selected resource as 47% is less than 80%.

In particular embodiments, resource prediction generating process 508 then constructs or populates, at 606, a second data array 510 within data store 24 or other suitable data store that includes the selected web pages and the corresponding selected resources, or identifiers for the selected resources, for each of the selected web pages. By way of example the second data array 510 may take the form of a resource prediction hash table 510 that links web page identifiers for corresponding selected web pages with one or more resource identifiers corresponding to the selected resources identified at 604 for each selected web page.

A method for setting one or more cookies in conjunction with serving a request for a web page will now be described with reference to the block diagram of FIG. 5 and the flowchart of FIG. 7. In an example embodiment, the method begins at 702 with receiving a request for a web page. As described above, the request generally includes a URL or other document identifier as well as metadata or other information. By way of example, the request may include information identifying the user, such as a user ID, as well as information identifying or characterizing the web browser or operating system running on the user's client computing device 30. The request may also include location information identifying a geographic location of the user's client device or a logical network location of the user's client device. The request may also include a timestamp identifying when the request was transmitted. At 704, an authentication process 212 may first determine whether the user making the request is authorized to receive the web page.

In particular embodiments, at 706, page-generating process 204 determines whether or not the requested web page is one of a subset of selected web pages for which resource pre-fetching may be performed. That is, for example, whether or not the requested web page is one of the selected web pages included in resource prediction hash table 510. If it is determined at 706 that the web page is a selected web page having one or more corresponding predetermined static resources specified in the hash table 510, then the method proceeds, at 708, with the page-generating process 204 accessing hash table 510 and identifying the selected resources predetermined to be likely required or used to generate the requested web page. In particular embodiments, page rendering process 204 then formulates a first response portion at 710 comprising a first portion of a structured document that either includes the corresponding selected resources identified in hash table 510 or identifiers to these selected resources (e.g., in the form of script, image, or object elements having corresponding source (src) identifiers for locating the selected resources). The first response portion is then transmitted to the client at 712. In particular embodiments, the first response portion, including the selected resources, or identifiers for the selected resources, is formulated as a first portion of an HTML head element of the structured document. The first portion of the HTML head element including the selected resources may be transmitted to the client device of the user requesting the web page over an HTTP or any other suitable connection. In particular embodiments, the connection over which the first response portion is transmitted to the client device is a persistent HTTP or TCP connection.

In particular embodiments, page generating process 204 then proceeds to generate the web page (e.g., in the form of an HTML or other structured document) at 714 including structured document code and the content to be displayed as well as the embedded resources, or embedded identifiers for the resources, for rendering the web page, which may include those resources that have already been transmitted in or identified in the first response portion. In particular embodiments, as page generating process 204 is generating the web page at 714, page generating process 204 also generates parameters for one or more cookies to be set at the client device. In particular embodiments, such as in the case that one or more of the cookie to be set are HTTPOnly cookies, as the parameters for the cookie(s) are generated with the construction of the web page, page generating process 204 buffers, or causes to be buffered, the parameters for the cookie(s). In particular embodiments, the buffered parameters are stored in a cache, using a facility such as memcached. In particular embodiments, a key for retrieving the stored parameters from memcached (or other suitable storage facility) is also generated.

Page generating process 204 then formulates a second response portion at 716 that includes the remainder (or a portion thereof) of the structured document for rendering the web page. That is, in particular embodiments, page generating process 204 first checks which resources in the structured document have already been transmitted or identified in the first response portion transmitted to the client device such that the second response portion, which will generally include a second portion of the HTML head element as well as a body or frameset element, includes all the code, content, and resources (or identifiers thereof) required to render the requested web page other than the resources transmitted in, or identified in, the first response portion. The second response portion is then transmitted to the client at 718. As described above, as the first response portion may be sent over a persistent connection (e.g., a persistent HTTP or TCP connection), the second response portion may be sent over the same connection.

In particular embodiments, the second response portion further includes the key for retrieving the parameters for the cookie(s) stored in memcached as well as an executable code segment. In particular embodiments, when the second response portion is received at the client, the executable code segment is configured to cause the client's web browser or other client application to generate and transmit a second request to the server. In particular embodiments, the executable code segment transmitted in the second response portion is, or includes, a JavaScript code segment that causes the client's web browser to formulate and transmit an AJAX call or other suitable second request to the server (e.g., server 22) that also includes the key for retrieving the cookie parameters. Upon receipt of the AJAX call (or other second suitable request) at 720, the server uses the key to retrieve the cookie parameters at 722. In particular embodiments, page generating process 204 then formulates a third response (which may be transmitted in a second HTTP response) that includes the parameters for the cookie(s) in the HTTP header at 724. The third response may also include any remaining portion of the structured document. The third response is then transmitted to the client at 726. Upon receipt by the client, the client's web browser or other client application rendering the web page, sets the cookie(s) based on the parameters transmitted in the third response.

In particular embodiments, the second response portion may also include parameters for non-HTTPOnly cookies generated with the page at 714 as well as a corresponding executable code segment (e.g., a JavaScript code segment). In such embodiments, when the second response portion is received at the client, this executable code segment is configured to cause the client's web browser or other client application to set one or more non-HTTPOnly cookies at the client device based on the parameters in the second response portion.

Figure 7:
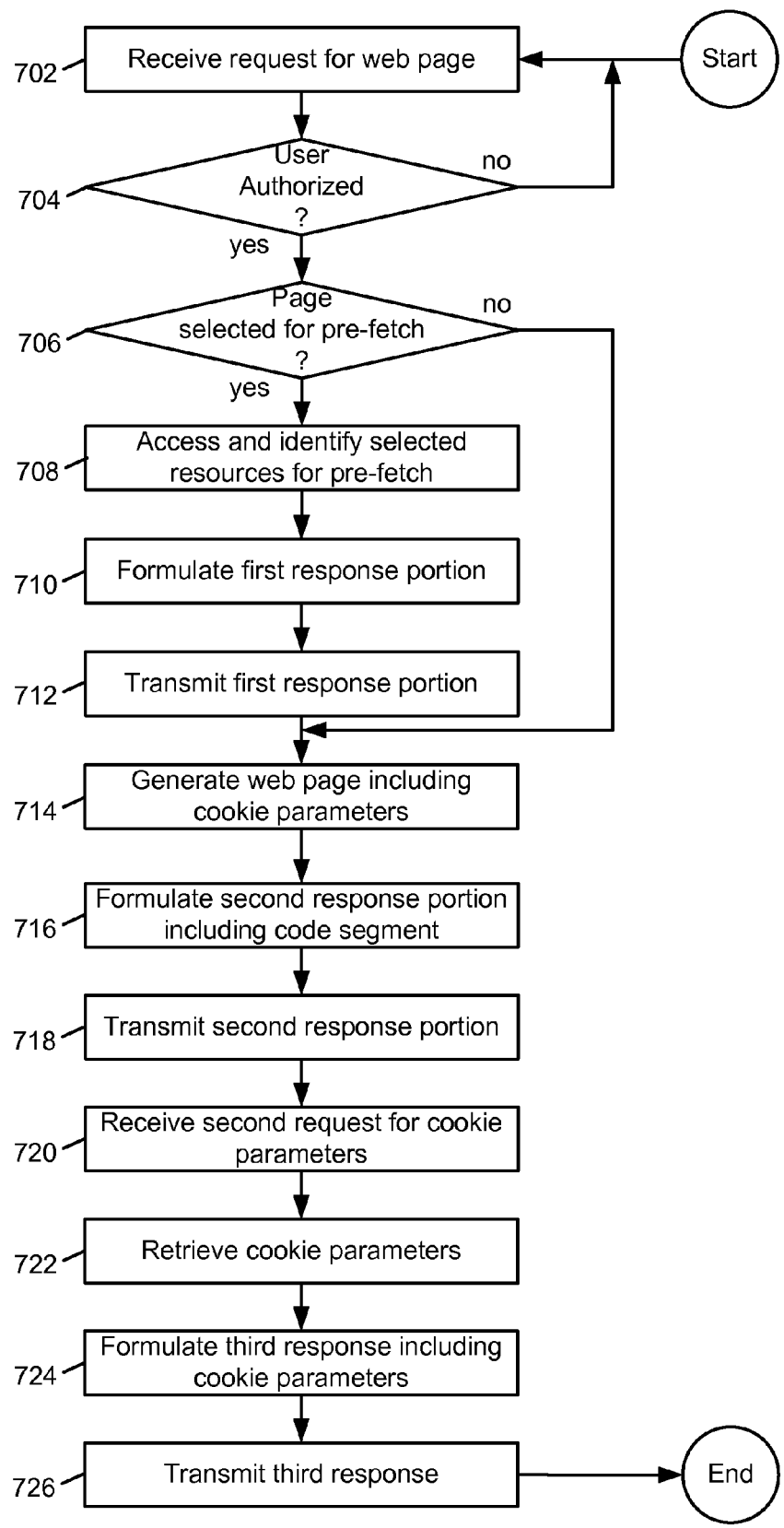
FIG. 7 shows a flowchart illustrating an example method for setting one or more cookies in conjunction with serving a request for a web page using resource pre-fetching.

In particular embodiments, if it is determined at 706 that the web page is not a web page selected for pre-fetch (or is a selected web page for which pre-fetch has been disabled) having one or more corresponding predetermined static resources specified in the resource prediction hash table 510, then the method may proceed with generating the web page at 714, formulating a response at 716 (in this case the second response is actually the first response), and so on in accordance with FIG. 7.

Furthermore, although the described embodiments of the resource prediction hash table 510 and methods of generating and utilizing the resource prediction hash table 510 were described at the page or URL level, it should be appreciated that, in other embodiments, the resource prediction table 510 may be constructed or populated and subsequently utilized based on other filtering criteria. By way of example, a resource prediction table 510 may be constructed for each registered user of social networking system 20. That is, resource prediction generating process 508 may scan resource utilization log 502 and filter the records to identify likely required resources for selected web pages as described above on a per user basis, rather than across all users as described above. Moreover, any other suitable filtering criteria may be used in addition or alternately to filtering the records within resource utilization log 502 based on web page, resource utilization probability, and/or user. By way of example, using other metadata stored in resource utilization log 502, records may be filtered based on geographic or logical network location (e.g., the selected resources sent in the first response to a user in the United States may be different than the selected resources sent in the first response to a user in China), browser type or operation system type (e.g., the selected resources sent in the first response to a client device running the Mozilla Firefox web browser may be different than the selected resources sent in the first response to a client device running the Internet Explorer web browser), among others.

As described herein, any of the described processes or methods can be implemented as a series of computer-readable instructions, embodied or encoded on or within a tangible data storage medium, that when executed are operable to cause one or more processors to implement the operations described above. For smaller datasets, the operations described above can be executed on a single computing platform or node. By way of example, in particular embodiments, the phased generation processes described above with reference to FIGS. 2, 3, 4, and 7 may be implemented by a single server process executing in server 22. That is, the web page generation and serving processes described above may be implemented on server 22. For larger systems and resulting data sets, parallel computing platforms can be used. For example, the resource logging, analyzing, filtering, predicting, and/or selecting operations discussed above can be implemented using Hive to accomplish ad hoc querying, summarization and data analysis, as well as using as incorporating statistical modules by embedding mapper and reducer scripts, such as Python or Perl scripts that implement a statistical algorithm. Other development platforms that can leverage Hadoop or other Map-Reduce execution engines can be used as well. The Apache Software Foundation has developed a collection of programs called Hadoop, which includes: (a) a distributed file system; and (b) an application programming interface (API) and corresponding implementation of MapReduce.

FIG. 1 illustrates an example distributed computing system, consisting of one master server 22a and two slave servers 22b. In some embodiments, the distributed computing system comprises a high-availability cluster of commodity servers in which the slave servers are typically called nodes. Though only two nodes are shown in FIG. 1, the number of nodes might well exceed a hundred, or even a thousand or more, in some embodiments. Ordinarily, nodes in a high-availability cluster are redundant, so that if one node crashes while performing a particular application, the cluster software can restart the application on one or more other nodes.

Multiple nodes also facilitate the parallel processing of large databases. In some embodiments, a master server, such as 22a, receives a job from a client and then assigns tasks resulting from that job to slave servers or nodes, such as servers 22b, which do the actual work of executing the assigned tasks upon instruction from the master and which move data between tasks. In some embodiments, the client jobs will invoke Hadoop's MapReduce functionality, as discussed above.

Likewise, in some embodiments, a master server, such as server 22a, governs a distributed file system that supports parallel processing of large databases. In particular, the master server 22a manages the file system's namespace and block mapping to nodes, as well as client access to files, which are actually stored on slave servers or nodes, such as servers 22b. In turn, in some embodiments, the slave servers do the actual work of executing read and write requests from clients and perform block creation, deletion, and replication upon instruction from the master server.

While the foregoing processes and mechanisms can be implemented by a wide variety of physical systems and in a wide variety of network and computing environments, the server or computing systems described below provide example computing system architectures for didactic, rather than limiting, purposes.

Figure 8:
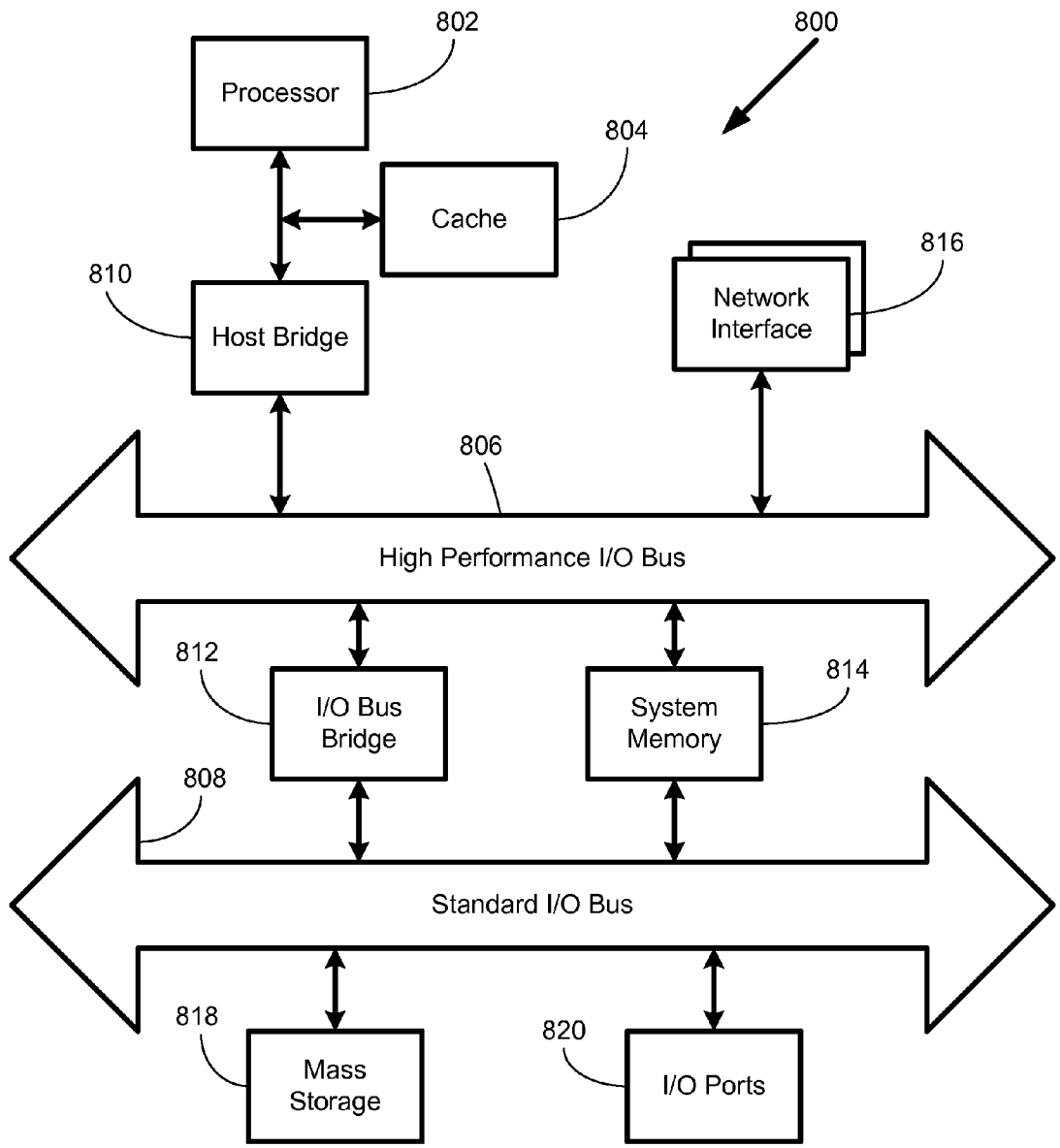
FIG. 8 illustrates an exemplary computer system architecture.

FIG. 8 illustrates an example computing system architecture, which may be used to implement a server 22, 22a, 22b, or a client device 30 (or each node of a distributed computing system). In one embodiment, hardware system 800 comprises a processor 802, a cache memory 804, and one or more executable modules and drivers, stored on a tangible computer readable medium, directed to the functions described herein. Additionally, hardware system 800 may include a high performance input/output (I/O) bus 806 and a standard I/O bus 908. A host bridge 810 may couple processor 802 to high performance I/O bus 806, whereas I/O bus bridge 812 couples the two buses 806 and 908 to each other. A system memory 814 and one or more network/communication interfaces 816 couple to bus 806. Hardware system 800 may further include video memory (not shown) and a display device coupled to the video memory. Mass storage 818, and I/O ports 820 couple to bus 908. Hardware system 800 may optionally include a keyboard and pointing device, and a display device (not shown) coupled to bus 908. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 800 are described in greater detail below. In particular, network interface 816 provides communication between hardware system 800 and any of a wide range of networks, such as an Ethernet (e.g., IEEE 802.3) network, a backplane, etc. Mass storage 818 provides permanent storage for the data and programming instructions to perform the above-described functions implemented in the servers 22a, 22b, whereas system memory 814 (e.g., DRAM) provides temporary storage for the data and programming instructions when executed by processor 802. I/O ports 820 are one or more serial and/or parallel communication ports that provide communication between additional peripheral devices, which may be coupled to hardware system 800.

Hardware system 800 may include a variety of system architectures; and various components of hardware system 800 may be rearranged. For example, cache 804 may be on-chip with processor 802. Alternatively, cache 804 and processor 802 may be packed together as a "processor module," with processor 802 being referred to as the "processor core." Furthermore, certain embodiments of the present invention may not require nor include all of the above components. For example, the peripheral devices shown coupled to standard I/O bus 908 may couple to high performance I/O bus 806. In addition, in some embodiments, only a single bus may exist, with the components of hardware system 800 being coupled to the single bus. Furthermore, hardware system 800 may include additional components, such as additional processors, storage devices, or memories.

In one implementation, the operations of the embodiments described herein are implemented as a series of executable modules run by hardware system 800, individually or collectively in a distributed computing environment. In a particular embodiment, a set of software modules and/or drivers implements a network communications protocol stack, parallel computing functions, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 802. Initially, the series of instructions may be stored on a storage device, such as mass storage 818. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 816. The instructions are copied from the storage device, such as mass storage 818, into memory 814 and then accessed and executed by processor 802.

An operating system manages and controls the operation of hardware system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present disclosure have been described as operating in connection with a social networking website, various embodiments of the present invention can be used in connection with any communications facility that supports web applications. Furthermore, in some embodiments the term "web service" and "web site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

The invention claimed is:

1. A method comprising:

receiving, by a computing system, a first request from a client for a target structured document;

accessing, by the computing system, a data structure comprising an entry for the target structured document and one or more first resources associated with the target structured document, the one or more first resources being resources that have been previously determined to each have at least a predetermined probability to be included in a response to a future request for the target structured document that exceeds a predetermined threshold value;

accessing, by the computing system, a data structure comprising an entry for the target structured document and one or more first resources associated with the target structured document, the one or more first resources are resources having been previously determined to each have at least a predetermined probability to be included in a response to a future request for the target structured document that exceeds a predetermined threshold value;

in a first response phase, transmitting, by the computing system, a first portion of the target structured document to the client, the first portion of the target structured document including one or more of the first resources or references for one or more of the first resources;

generating, by the computing system and after the first response phase, the target structured document and one or more parameters for one or more state objects associated with the client;

in a second response phase, transmitting, by the computing system, a second portion of the target structured document, wherein the second portion of the target structured document includes a code segment;

receiving, by the computing system, a second request from the client, wherein the second request is sent from the client as a result of the client executing the code segment; and transmitting, by the computing system, a response to the second request that comprises the one or more parameters for the one or more state objects.

2. A method comprising:

receiving, by a computing system, a first request from a client for a target structured document;

accessing, by the computing system, a data structure comprising an entry for the target structured document and one or more first resources associated with the target structured document, the one or more first resources being resources that have been previously determined to each have at least a predetermined probability to be included in a response to a future request for the target structured document that exceeds a predetermined threshold value;

in a first response phase, transmitting, by the computing system, a first portion of the target structured document to the client, the first portion of the target structured document including one or more of the first resources or references for one or more of the first resources;

generating, by the computing system and after the first response phase, the target structured document and one or more parameters for one or more state objects associated with the client; and in a second response phase, transmitting, by the computing system, a second portion of the target structured document that includes the one or more parameters and a code segment, wherein the code segment, when executed by the client, is operative to cause the client to set the one or more state objects based on the one or more parameters.

3. A system comprising:
one or more processors; and
logic encoded in one or more computer-readable tangible storage media that, when executed by the one or more processors, is operable to:
receive a first request from a client for a target structured document;
access a data structure comprising an entry for the target structured document and one or more first resources associated with the target structured document, the one or more first resources are resources that have been previously determined to each have at least a predetermined probability to be included in a response to a future request for the target structured document that exceeds a predetermined threshold value;
in a first response phase, transmit a first portion of the target structured document to the client, the first portion of the target structured document including one or more of the first resources or references for one or more of the first resources;
generate, after the first response phase, the target structured document and one or more parameters for one or more state objects associated with the client;
in a second response phase, transmit a second portion of the target structured document, wherein the second portion of the target structured document includes a code segment;
receive a second request from the client, wherein the second request is sent from the client as a result of the client executing the code segment; and
transmit a response to the second request that comprises the one or more parameters for the one or more state objects.

* * * * *